United States Patent [19]

Hakamata et al.

[11] Patent Number: 5,065,008

[45] Date of Patent: Nov. 12, 1991

[54] SCANNING MICROSCOPE AND SCANNING MECHANISM FOR THE SAME

[75] Inventors: Kazuo Hakamata; Toshihito Kimura, both of Kanagawa, Japan

[73] Assignee: Fuji Photo Film Co., Ltd., Kanagawa, Japan

[21] Appl. No.: 599,780

[22] Filed: Oct. 17, 1990

[30] Foreign Application Priority Data

Oct. 18, 1989 [JP] Japan .................................. 1-270744
Oct. 20, 1989 [JP] Japan .................................. 1-272945

[51] Int. Cl.⁵ .............................................. H01J 3/14
[52] U.S. Cl. .................................. 250/216; 250/234; 359/385; 359/386
[58] Field of Search ...................... 250/216, 234, 548; 350/523, 524, 350 S

[56] References Cited

U.S. PATENT DOCUMENTS

| 4,677,301 | 6/1987 | Tanimoto et al. | 250/548 |
| 4,712,873 | 12/1987 | Kanbe et al. | 350/350 S |
| 4,806,004 | 2/1989 | Wayland | 350/523 |
| 4,958,082 | 9/1990 | Makinouchi et al. | 250/548 |

FOREIGN PATENT DOCUMENTS 62-209510 9/1987 Japan .
63-306414 12/1988 Japan .

Primary Examiner—David C. Nelms
Assistant Examiner—Teresa Davenport
Attorney, Agent, or Firm—Sughrue, Mion, Zinn, Macpeak & Seas

[57] ABSTRACT

A confocal scanning microscope comprises a light projecting device with which a small light spot of a light beam is formed on a sample, and a scanning mechanism which causes the light spot to scan the sample in main scanning and sub-scanning directions. A light receiving device condenses the light beam, which has passed through the sample, and an image of the condensed light beam is formed as a point image. A shutter array provided with a plurality of small light shutters, which are arrayed two-dimensionally, is located at a plane on which the point image is formed. An operating circuit sets a light shutter corresponding to the position, at which the point image is formed at any given instant, to an open state in synchronization with the main scanning and the sub-scanning with the light spot. A photodetector having a light receiving surface, which faces the whole surface of the shutter array, detects the point image through the light shutter, which has been set to the open state. A circuit divides the output of the photodetector into picture elements in synchronization with the main scanning and the sub-scanning.

24 Claims, 12 Drawing Sheets

SCANNING MICROSCOPE AND SCANNING MECHANISM FOR THE SAME

BACKGROUND OF THE INVENTION

1. Field of the Invention

This invention relates to a confocal scanning microscope, which is of the transmission type wherein light, which has passed through a sample, is detected. This invention also relates to a scanning microscope provided with an improved mechanism for scanning a sample with a light beam. This invention also relates to a novel scanning mechanism for use in a scanning microscope.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, or the light beam, which has been reflected from the sample during the scanning, is detected by a photodetector. An enlarged image of the sample is thereby obtained.

As one type of the scanning microscopes, a confocal scanning microscope has heretofore been proposed. With the confocal scanning microscope, a light beam is produced by a light source and is condensed to a light spot such that an image of the light spot is formed on a sample. Also, a point image of the light beam, which has been radiated out of the sample, is formed and detected by a photodetector. The confocal scanning microscope is advantageous in that no pinhole need be located on the surface of the sample.

Basically, the confocal scanning microscope comprises:

(i) a sample supporting member on which a sample is supported, (ii) a light source which produces a light beam, (iii) a light projecting optical means with which an image of the light beam is formed as a small light spot on the sample, (iv) a light receiving optical means with which the light beam radiated out of the sample (i.e. the light beam, which has passed through the sample, or the light beam, which has been reflected from the sample) is condensed, and an image of the condensed light beam is formed as a point image, (v) a photodetector which detects the point image, and (vi) scanning mechanism for scanning the sample with the light spot in a main scanning direction and a subscanning direction.

In general, a pinhole plate is located on the upstream side of the photodetector in order to block a halo occurring around the point image and light scattered from the sample.

Confocal scanning microscopes are classified into a reflection type wherein a light beam, which has been reflected from a sample, is detected and a transmission type wherein a light beam, which has passed through a sample, is detected. Examples of the transmission type confocal scanning microscopes are disclosed in Japanese Unexamined Patent Publication Nos. 62(1987)-209510 and 63(1988)-306414.

The conventional confocal scanning microscope utilizes one of the following scanning mechanisms:

(1) a mechanism which two-dimensionally moves the sample supporting member, and (2) a mechanism which two-dimensionally deflects the light beam by a light deflector.

However, the scanning mechanism described in (1) has the problem in that the sample flies out of its correct position when it is scanned quickly.

With the scanning mechanism described in (2), quick scanning can be achieved. However, in cases where the scanning mechanism described in (2) is employed in the transmission type confocal scanning microscope, the problems described below occur. Specifically, in such cases, a light beam, which is irradiated to a sample, is deflected, and the position, at which an image of the light beam which has passed through the sample is formed, changes in accordance with the position to which the light beam irradiated to the sample is deflected. Therefore, it is necessary for the photodetector to be moved in synchronization with the deflection of the light beam, which is irradiated to the sample. In cases where the photodetector is fixed, instead of being thus moved, a means must be used with which the light beam, which has passed through the sample, is deflected in synchronization with the scanning of the sample with the light beam. In cases where the mechanism for moving the photodetector or the means for deflecting the light beam, which has passed through the sample, is used, the confocal scanning microscope cannot be kept simple.

In order to eliminate the aforesaid problems, a novel mechanism has been proposed in, for example, Japanese Unexamined Patent Publication No. 62(1987)209510. With the proposed mechanism, the rear surface of a vibrating mirror, which deflects a light beam, is constituted as a reflection surface. The light beam, which has passed through a sample, is guided to the rear surface of the vibrating mirror and reflected and deflected thereby in ways which cancel the deflection of the light beam, which is irradiated to the sample. With the proposed mechanism, a photodetector need not be moved in synchronization with the deflection of the light beam, which is irradiated to the sample. However, with the proposed mechanism, many mirrors must be used in order to guide the light beam, which has passed through the sample, to the rear surface of the vibrating mirror. Therefore, the optical means becomes very complicated and difficult to assemble and adjust.

Also, in cases where the scanning mechanism described in (2) is employed, the problems occur in that it is difficult for the characteristics of the means for deflecting the light beam, which is irradiated to the sample, and the characteristics of the means for deflecting the light beam, which has passed through the sample, to be completely matched with each other. If the characteristics of both means do not completely match with each other, the light beam, which has passed through the sample, cannot be detected accurately.

SUMMARY OF THE INVENTION

The primary object of the present invention is to provide a transmission type confocal scanning microscope wherein a photodetector need not be moved in synchronization with the deflection of a light beam, which is irradiated to a sample, or the light beam, which has passed through the sample, need not be deflected in synchronization with the scanning of the sample, and wherein the configuration of an optical means is kept simple.

Another object of the present invention is to provide a scanning microscope which is provided with a simple scanning mechanism and which is manufactured at a low cost.

A further object of the present invention is to provide a scanning microscope which is easy to assemble and adjust, which has good durability, and in which a sample is scanned over a large width.

The specific object of the present invention is to provide a scanning mechanism which is suitable for use in the scanning microscope.

The present invention provides a first confocal scanning microscope comprising:

(i) a sample supporting member on which a sample is supported, (ii) a light source which produces a light beam, (iii) a light projecting optical means with which an image of said light beam is formed as a small light spot on said sample, (iv) a scanning mechanism which causes said light spot to scan said sample in main scanning directions and sub-scanning directions, (v) a light receiving optical means with which the light beam, which has passed through said sample, is condensed, and an image of the condensed light beam is formed as a point image, (vi) a shutter array provided with a plurality of small light shutters, which are arrayed two-dimensionally, said shutter array being located at a plane on which said point image is formed, (vii) a shutter array operating circuit which sets a light shutter corresponding to the position, at which said point image is formed at any given instant, to an open state in synchronization with the main scanning and the sub-scanning with said light spot, said shutter array operating circuit thus setting said light shutters one after another to the open state, (viii) a photodetector having a light receiving surface, which faces the whole surface of said shutter array, said photodetector detecting said point image through the light shutter, which has been set to the open state, and (ix) a circuit for dividing the output of said photodetector into picture elements in synchronization with the main scanning and the sub-scanning with said light spot.

With the first confocal scanning microscope in accordance with the present invention, the light shutter, which is set to the open state, changes sequentially. Therefore, the same effects as those, which are obtained when a pinhole plate is moved on the upstream side of the light receiving surface of the photodetector, can be achieved. Specifically, the surface photodetector is employed as the photodetector such that the same effects as those, which are obtained when a point photodetector is moved in accordance with the scanning with the light beam, may be achieved. Also, with the first confocal scanning microscope in accordance with the present invention, it is not necessary that a complicated mechanical scanning mechanism be used which is necessary when a point photodetector is moved.

Additionally, with the first confocal scanning microscope in accordance with the present invention, it is not necessary that the light beam, which has passed through the sample, be deflected in synchronization with the scanning with the light spot. Therefore, basically, the light receiving optical means for the light beam, which has passed through the sample, can be constituted of a single objective lens, and can thus be kept markedly simple.

The present invention also provides a second confocal scanning microscope comprising:

(i) a sample supporting member on which a sample is supported, (ii) a light source which produces a light beam, (iii) a light projecting optical means with which an image of said light beam is formed as a small light spot on said sample, (iv) a scanning mechanism which causes said light spot to scan said sample in main scanning directions and sub-scanning directions, (v) a light receiving optical means with which the light beam, which has passed through said sample, is condensed, and an image of the condensed light beam is formed as a point image, (vi) a shutter array provided with a plurality of linear light shutters, which extend along said main scanning directions and which stand side by side along said sub-scanning directions, said shutter array being located at a plane on which said point image is formed, (vii) a shutter array operating circuit which sets a light shutter corresponding to the position, at which said point image is formed at any given instant, to an open state in synchronization with the sub-scanning wit said light spot, said shutter array operating circuit thus setting said light shutters one after another to the open state, and (viii) a photodetector constituted of an area sensor having a plurality of small light receiving elements, which are arrayed along said main scanning directions and said sub-scanning directions, said photodetector detecting said point image through the light shutter, which has been set to the open state.

With the second confocal scanning microscope in accordance with the present invention, the light shutters have the effects of blocking a halo, which occurs occur around the point image, and blocking light scattered from the sample. These effects are obtained only with respect to the sub-scanning directions. Even in such cases, the resolution of the image of the sample can be kept very good because the incidence of the halo and the scattered light upon each light receiving element of the photodetector occurs only with respect to the main scanning directions. On the other hand, in cases where no light shutter is used, the incidence of the halo and the scattered light upon each light receiving element of the photodetector occurs with respect to both the main scanning directions and the sub-scanning directions.

In the first and second confocal scanning microscopes in accordance with the present invention, the scanning with the light spot may often become nonuniform in a single microscope with the passage of time or among different microscopes due to, for example, a fluctuation in the characteristics of the light deflector which constitutes the mechanism for scanning with the light spot. In such cases, the ways in which the shutter array is operated may be changed such that the light shutter corresponding to the position, at which the point image is formed, may be accurately set to the open state.

In the first and second confocal scanning microscopes in accordance with the present invention, liquid crystal shutters, PLZT shutters, or the like, may be employed as the light shutters.

With the first and second confocal scanning microscopes in accordance with the present invention, a sample is scanned two-dimensionally, and the light beam, which has passed through the sample, is detected by the stationary photodetector through the shutter array, which sequentially opens the light shutters. Therefore, a mechanism for moving the photodetector and a means for deflecting the light beam, which has passed through the sample, need not be used. Accordingly, the first and second confocal scanning microscopes in accordance with the present invention can be kept simple.

Also, the first and second confocal scanning microscopes in accordance with the present invention have various advantages over a conventional confocal scanning microscope, wherein a light beam, which has passed through a sample, is guided to the rear surface of a vibrating mirror. Specifically, with the first and second confocal scanning microscopes in accordance with the present invention, mirrors for guiding the light beam, which has passed through a sample, to the rear surface of the vibrating mirror need not be used. Therefore, the optical means can be kept very simple. Accordingly, the first and second confocal scanning microscopes in accordance with the present invention are easy to assemble and adjust.

Additionally, with the first and second confocal scanning microscopes in accordance with the present invention, in cases where the scanning of the light spot on the sample may becomes nonuniform, the ways in which the shutter array is operated can be changed such that the the light beam, which has passed through the sample, may accurately pass through a light shutter. Therefore, adverse effects of nonuniform scanning can be eliminated, and an image having good resolution can be obtained.

The present invention further provides a third scanning microscope comprising:

(i) a means for converging a light beam, which is irradiated to a sample, to a small light spot on said sample, (ii) a scanning mechanism for two-dimensionally scanning said light spot on said sample, and (iii) a means for photoelectrically detecting the light beam, which is radiated out of said sample and thereby obtaining an image signal representing an enlarged image of said sample, wherein said scanning mechanism is composed of:

(a) a shutter array provided with a plurality of small light shutters, which are arrayed two-dimensionally, said shutter array being located in the optical path of said light beam, which is irradiated to said sample, and (vii) a shutter array operating circuit which sets said light shutters of said shutter array one after another to an open state.

With the third scanning microscope in accordance with the present invention, the light shutter, which is set to the open state, changes sequentially, and the position on the shutter array from which the light beam is radiated to the sample is thereby changed. In this manner, the light spot of the light beam two-dimensionally scans the sample.

In the third scanning microscope in accordance with the present invention, liquid crystal shutters, PLZT shutters, or the like, may be employed as the light shutters.

With the third scanning microscope in accordance with the present invention, the light beam is passed through the shutter array, which opens the light shutters one after another. The light beam, which has passed through the shutter array, is then caused to scan the sample two-dimensionally. Therefore, the mechanism for scanning the light beam, which is irradiated to the sample, can be kept very simple. Accordingly, the manufacturing cost of the third scanning microscope in accordance with the present invention can be kept low.

The shutter array is advantageous over a combination of two light deflectors in that it is easy to assemble and adjustment of optical axis can be achieved easily with electric adjustment. Therefore, the third scanning microscope in accordance with the present invention is easy to assemble and adjust. This feature also contributes to the reduction in the manufacturing cost.

Also, the shutter array has no mechanical movable part, and the size of the shutter array can be enlarged comparatively easily. Therefore, the third scanning microscope in accordance with the present invention has good durability. Additionally, the sample can be scanned over a large width, and a wide field of view can be ensured.

The present invention still further provides a scanning mechanism for converging a light beam, which is irradiated to a material to be scanned, to a small light spot on said material to be scanned, and two-dimensionally scanning said light spot on said material to be scanned, wherein the improvement comprises the provision of:

(a) a shutter array provided with a plurality of small light shutters, which are arrayed two-dimensionally, said shutter array being located in the optical path of said light beam, which is irradiated to said material to be scanned, and (vii) a shutter array operating circuit which sets said light shutters of said shutter array one after another to an open state.

DESCRIPTION OF THE PREFERRED EMBODIMENTS

The present invention will hereinbelow be described in further detail with reference to the accompanying drawings.

Figure 1:
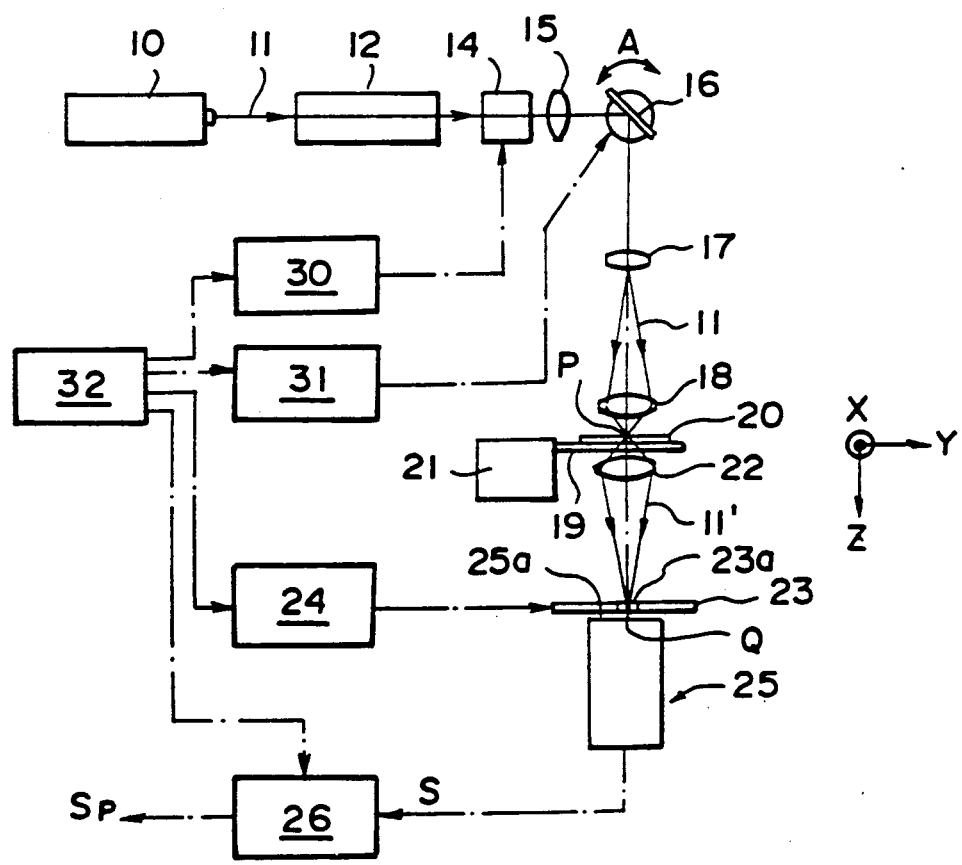
FIG. 1 is a schematic side view showing an embodiment of the first confocal scanning microscope in accordance with the present invention.

FIG. 1 is a schematic side view showing an embodiment of the first confocal scanning microscope in accordance with the present invention.

With reference to FIG. 1, a laser beam 11 is produced as a collimated light beam by a laser beam source 10. The beam diameter of the laser beam 11 is expanded by a beam expander 12, and the laser beam 11 then impinges upon an acousto-optic light deflector (AOD) 14. The laser beam 11 is deflected in directions, which are approximately normal to the plane of the sheet of FIG. 1, by the AOD 14. Thereafter, the laser beam 11 passes through a relay lens 15, which is used to eliminate the aberration, and impinges upon a vibrating mirror 16. The vibrating mirror 16 swings in the directions indicated by the double headed arrow A and deflects the laser beam 11 in directions, which are approximately normal to the directions in which the laser beam 11 was deflected by the AOD 14.

The laser beam 11, which has been deflected by the vibrating mirror 16, passes through a relay lens 17 and impinges upon an objective lens 18. The objective lens 18 forms an image of a small light spot of the laser beam 11 at a point P on a sample 20 (i.e. on the surface of the sample 20 or in the inside of the sample 20). The sample 20 is placed on a sample supporting member 19. The sample supporting member 19 can be moved by a vertical movement mechanism 21 along the directions indicated by the arrow Z, i.e. along the optical axis of the objective lens 18.

Figure 2:
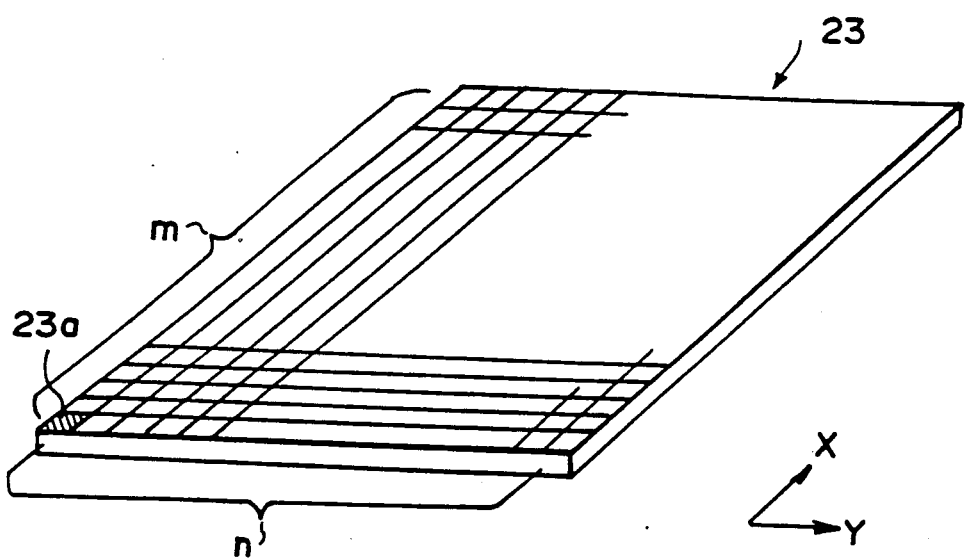
FIG. 2 is a perspective view showing a liquid crystal panel, which is employed in the embodiment of FIG. 1.

The laser beam 11', which has passed through the sample 20, then passes through an objective lens 22. The objective lens 22 forms a point image Q of the laser beam 11'. A liquid crystal panel 23 is located at the plane on which the point image Q is formed. As illustrated in FIG. 2, the liquid crystal panel 23 has a plurality of small liquid crystal shutters 23a, 23a, which are arrayed in a matrix form. A liquid crystal panel operating circuit 24 operates the liquid crystal panel 23 such that one of the liquid crystal shutters 23a, 23a, ... is selectively set to an open state. The liquid crystal shutters 23a, 23a, ... are thus selectively and sequentially set to the open state.

A photodetector 25, which may be constituted of a photomultiplier, is located below the liquid crystal panel 23. The photodetector 25 has a light receiving surface 25a, which faces the whole surface of the liquid crystal panel 23. The laser beam 11', which has formed the point image Q, passes through a liquid crystal shutter 23a, which has been set to the open state. The laser beam 11', which has passed through the liquid crystal shutter 23a, impinges upon the light receiving surface 25a. Therefore, a signal representing the brightness of the point image Q is generated by the photodetector 25. Because the point image Q is detected through the small liquid crystal shutter 23a, a halo occurring around the point image Q and the laser beam, which is scattered from the sample 20, can be blocked.

As described above, the laser beam 11 impinging upon the sample 20 is deflected by the AOD 14. Therefore, the light spot formed at the point P scans the sample 20 in main scanning directions indicated by the arrow X. Also, the laser beam 11 is deflected by the vibrating mirror 16. Therefore, the light spot formed at the point P also scans the sample 20 in sub-scanning directions indicated by the arrow Y, which directions are approximately normal to the main scanning directions indicated by the arrow X.

A control circuit 32 feeds synchronizing signals to an operation circuit 30, which operates the AOD 14, and to an operation circuit 31, which operates the vibrating mirror 16. The AOD 14 and the vibrating mirror 16 are controlled by the synchronizing signals such that the main scanning and the sub-scanning are synchronized with each other. The liquid crystal panel 23 is constituted as illustrated in FIG. 2. Specifically, m number of liquid crystal shutters 23a, 23a, ... stand one behind another along the main scanning directions indicated by the arrow X. Also, n number of rows of the liquid crystal shutters 23a, 23a, ... stand side by side along the sub-scanning directions indicated by the arrow Y.

When the light spot formed at the point P is caused to scan two-dimensionally in the manner described above, the position at which the point image Q is formed moves two-dimensionally in accordance with the scanning. In order to cope with the movement of the position of the point image Q, the liquid crystal panel operating circuit 24 receives a synchronizing signal from the control circuit 32. In accordance with the synchronizing signal, the liquid crystal panel operating circuit 24 operates the liquid crystal panel 23 in synchronization with the main scanning and the sub-scanning with the light spot formed at the point P such that a liquid crystal shutter 23a corresponding to the position, at which the point image Q is formed at any given instant, is set to the open state. In this manner, the liquid crystal shutters 23a, 23a, ... are set to the open state one after another. Specifically, in FIG. 2, m number of the liquid crystal shutters 23a, 23a, ..., which stand one behind another in the first row along the X direction, are first set to the open state one after another. Thereafter, m number of the liquid crystal shutters 23a, 23a, ... in the second row are set to the open state one after another. In the same manner, m number of the liquid crystal shutters 23a, 23a, ... in each of the third, fourth, ..., n'th rows are sequentially set to the open state. In this manner, a time-serial signal S representing a two-dimensional image of the sample 20 is generated by the photodetector 25. The signal S is fed to a signal processing circuit 26, which receives a synchronizing signal from the control circuit 32. By way of example, the signal processing circuit 26 integrates the signal S with a predetermined period and in synchronization with the main scanning and the subscanning with the light spot formed at the point P (i.e. in synchronization with the change of the liquid crystal shutter 23a which is set to the open state). In this manner, a signal Sp, which has been divided into picture elements, is obtained.

The scanning with the light spot formed at the point P may often become nonuniform in a single microscope with the passage of time or among different microscopes due to, for example, fluctuations in the characteristics of the AOD 14 and the vibrating mirror 16. In such cases, the relationship between the synchronizing signal, which is fed to the liquid crystal panel operating circuit 24, and the address of the liquid crystal shutter 23a, which is set to the open state by the liquid crystal panel operating circuit 24, may be changed in accordance with the nonuniformity of the scanning. In this manner, the liquid crystal shutter 23a corresponding to the position, at which the point image Q is formed at any given instant, can be accurately set to the open state.

In this embodiment, the sample supporting member 19 can be moved by the vertical movement mechanism 21 in the directions indicated by the arrow Z, which directions are normal to the main scanning directions indicated by the arrow X and the sub-scanning directions indicated by the arrow Y. The two-dimensional scanning with the light spot formed at the point P is carried out each time the sample 20 is moved a predetermined distance along the directions indicated by the arrow Z. In this manner, only the information at the focusing plane can be detected by the photodetector 25. The signal S generated by the photodetector 25 may be stored on a frame memory. In this manner, a signal can be obtained which represents the image information at every focusing plane within the range of movement of the sample 20 along the directions indicated by the arrow Z.

Figure 3:
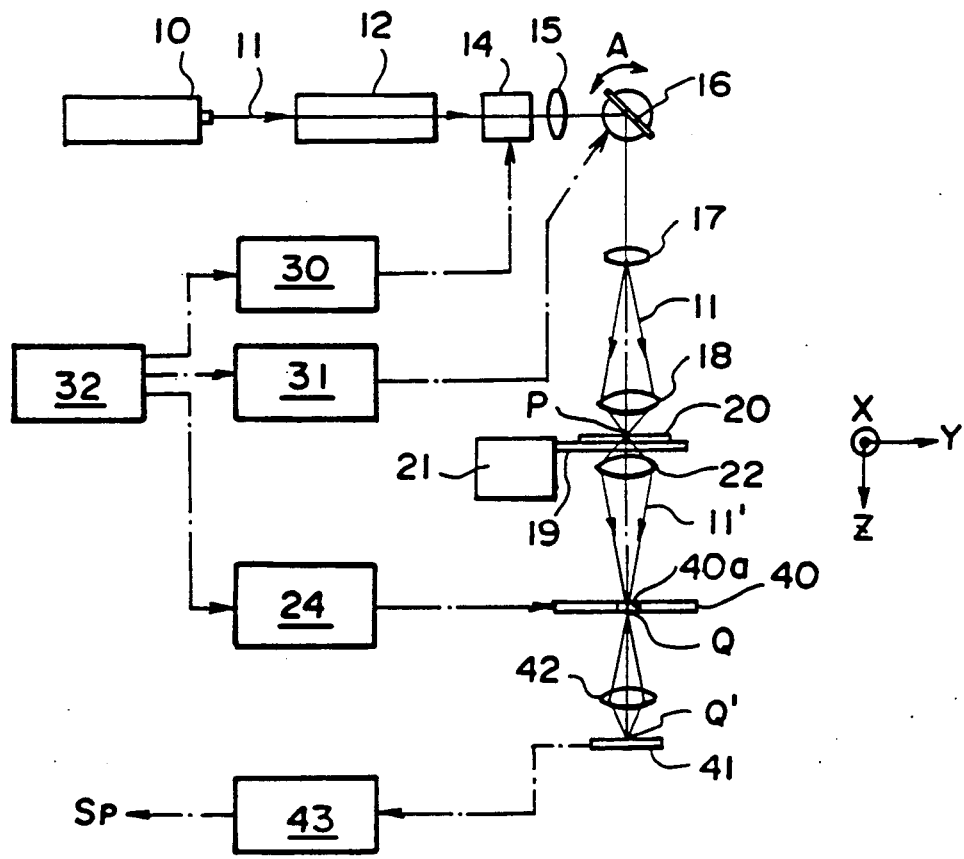
FIG. 3 is a schematic side view showing an embodiment of the second confocal scanning microscope in accordance with the present invention.

An embodiment of the second confocal scanning microscope in accordance with the present invention will hereinbelow be described with reference to FIG. 3. In FIG. 3, similar elements are numbered with the same reference numerals with respect to FIG. 1.

Figure 4:
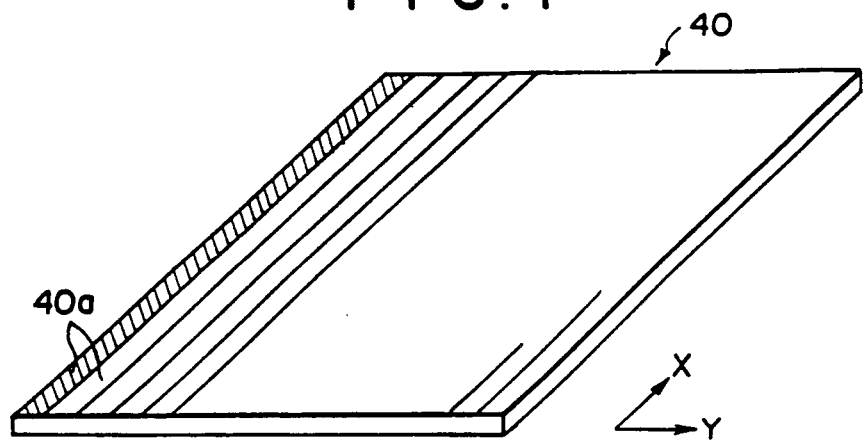
FIG. 4 is a perspective view showing a liquid crystal panel, which is employed in the embodiment of FIG. 3.

In this embodiment, instead of the liquid crystal panel 23 shown in FIG. 1 being used, a liquid crystal panel 40 shown in FIG. 4 is employed. As illustrated in FIG. 4, the liquid crystal panel 40 is provided with a plurality of linear liquid crystal shutters 40a, 40a, ..., which extend along the main scanning directions indicated by the arrow X and which stand side by side along the sub-scanning directions indicated by the arrow Y. Also, a photodetector 41 is constituted of an area sensor having a plurality of small light receiving elements, which are arrayed along the main scanning directions and the sub-scanning directions. Specifically, as the photodetector 41, a charge coupled device (CCD), an MOS device, or the like, may be employed. The laser beam 11', which has passed through a liquid crystal shutter 40a, impinges upon a small projection lens 42. The projection lens 42 forms a point image Q' of the laser beam 11' on the photodetector 41. The output of the photodetector 41 is fed into a signal processing circuit 43.

In this embodiment, the liquid crystal panel operating circuit 24 operates the liquid crystal panel 40 in synchronization with the sub-scanning with the light spot formed at the point P such that a liquid crystal shutter 40a corresponding to the position, at which the point image Q is formed at any given instant, is set to the open state. The laser beam 11' passes through the liquid crystal shutter 40a, 40a, ..., which are thus set to the open state one after another, and the point image Q' scans two-dimensionally on the photodetector 41. Therefore, a signal Sp, which represents an enlarged image of the sample 20 and which has been divided into picture elements, is generated by the signal processing circuit 43.

In this embodiment, the light shutters 40a, 40a, ... have the effects of blocking a halo, which occurs occur around the point image Q, and blocking the laser beam scattered from the sample 20. These effects are obtained only with respect to the sub-scanning directions. Even in such cases, for the reasons described above, the resolution of the image of the sample 20 can be kept markedly better than when the light shutters 40a, 40a, ... are not provided.

In the aforesaid embodiment of the first confocal scanning microscope in accordance with the present invention, in order for good resolution to be obtained, it is desirable that the effective shutter sizes of the liquid crystal shutters 23a, 23a, ... of the liquid crystal panel 23 be sufficiently small. For this purpose, as shown in FIG. 5, a liquid crystal panel 23', which is of the same type as the liquid crystal panel 23, may be superposed upon the liquid crystal panel 23 such that the positions of each liquid crystal shutter 23a and the corresponding liquid crystal shutter 23a', which have the same size, deviate by a ½ pitch along the main scanning directions and the sub-scanning directions.

Figure 5:
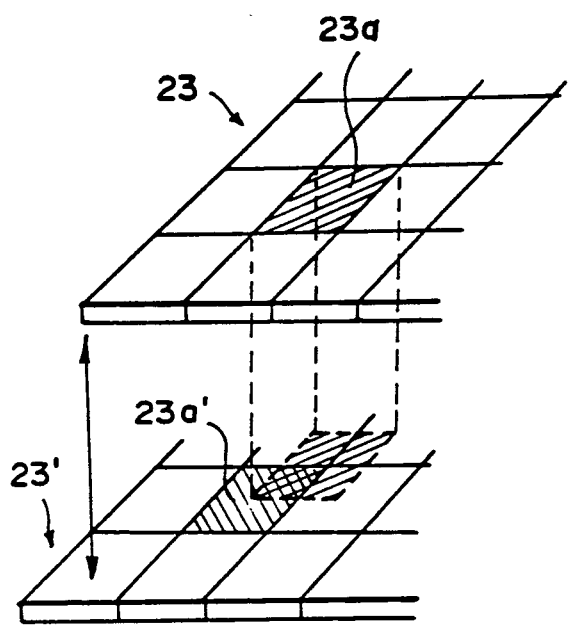
FIG. 5 is an exploded perspective view showing a combination of liquid crystal panels, which may be employed in the first confocal scanning microscope in accordance with the present invention.

With the combination of the liquid crystal panel 23 and the liquid crystal panel 23' shown in FIG. 5, the laser beam 11' can pass only through the part at which a liquid crystal shutter 23a and a liquid crystal shutter 23a', which have been set to the open state and which are hatched in FIG. 5, overlap one upon the other. Therefore, the liquid crystal panel 23 and the liquid crystal panel 23' are operated such that the period, with which a liquid crystal shutter 23a set to the open state changes (i.e. the time occurring from when a certain liquid crystal shutter 23a is set to the open state to when the adjacent liquid crystal shutter 23a is set to the open state), and the period, with which a liquid crystal shutter 23a' set to the open state changes, deviate by a ½ period from each other. As a result, the effective shutter size becomes equal to approximately ¼ of the size of the liquid crystal shutter 23a or the liquid crystal shutter 23a' when the boundary part between adjacent shutters is not taken into consideration.

Figure 6:
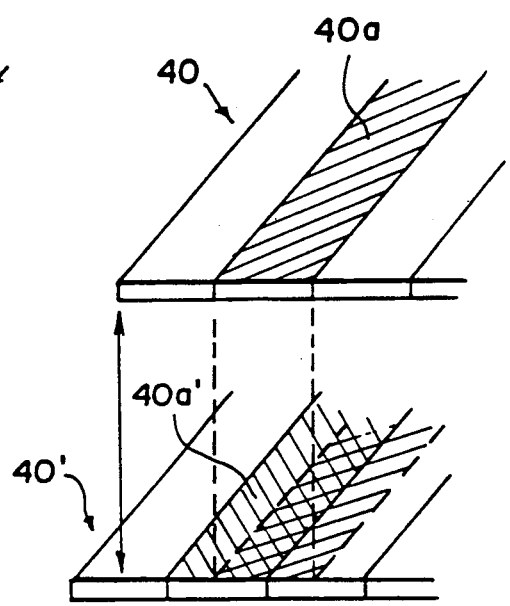
FIG. 6 is a exploded perspective view showing a combination of liquid crystal panels, which may be employed in the second confocal scanning microscope in accordance with the present invention.

Also, in the aforesaid embodiment of the second confocal scanning microscope in accordance with the present invention, in order for good resolution to be obtained, it is desirable that the effective shutter widths of the liquid crystal shutters 40a, 40a, ... of the liquid crystal panel 40 be sufficiently small. For this purpose, as shown in FIG. 6, a liquid crystal panel 40', which is of the same type as the liquid crystal panel 40, may be superposed upon the liquid crystal panel 40 such that the positions of each liquid crystal shutter 40a and the corresponding liquid crystal shutter 40a', which have the same size, deviate by a ½ pitch along the sub-scanning directions. In such cases, the liquid crystal panel 40 and the liquid crystal panel 40' are operated such that the period, with which a liquid crystal shutter 40a set to the open state changes, and the period, with which a liquid crystal shutter 40a' set to the open state changes, deviate by a ½ period from each other. As a result, the effective shutter width becomes equal to approximately ½ of the width of the liquid crystal shutter 40a or the liquid crystal shutter 40a' when the boundary part between adjacent shutters is not taken into consideration.

Instead of the AOD 14 and the vibrating mirror 16 being used, any of other known means, for example, a galvanometer mirror, a rotating polygon mirror, an electro-optic light deflector (EOD), or the like, may be employed as the light deflection means for deflecting the laser beam 11.

Also, instead of the liquid crystal shutters being used, other light shutters, for example, PLZT shutters, may be employed.

In the aforesaid embodiments of the first and second confocal scanning microscopes in accordance with the present invention, monochromatic microscope images are obtained. The first and second confocal scanning microscopes in accordance with the present invention are also applicable when color images are to be obtained.

Embodiments of the third scanning microscope in accordance with the present invention will be described hereinbelow.

Figure 7:
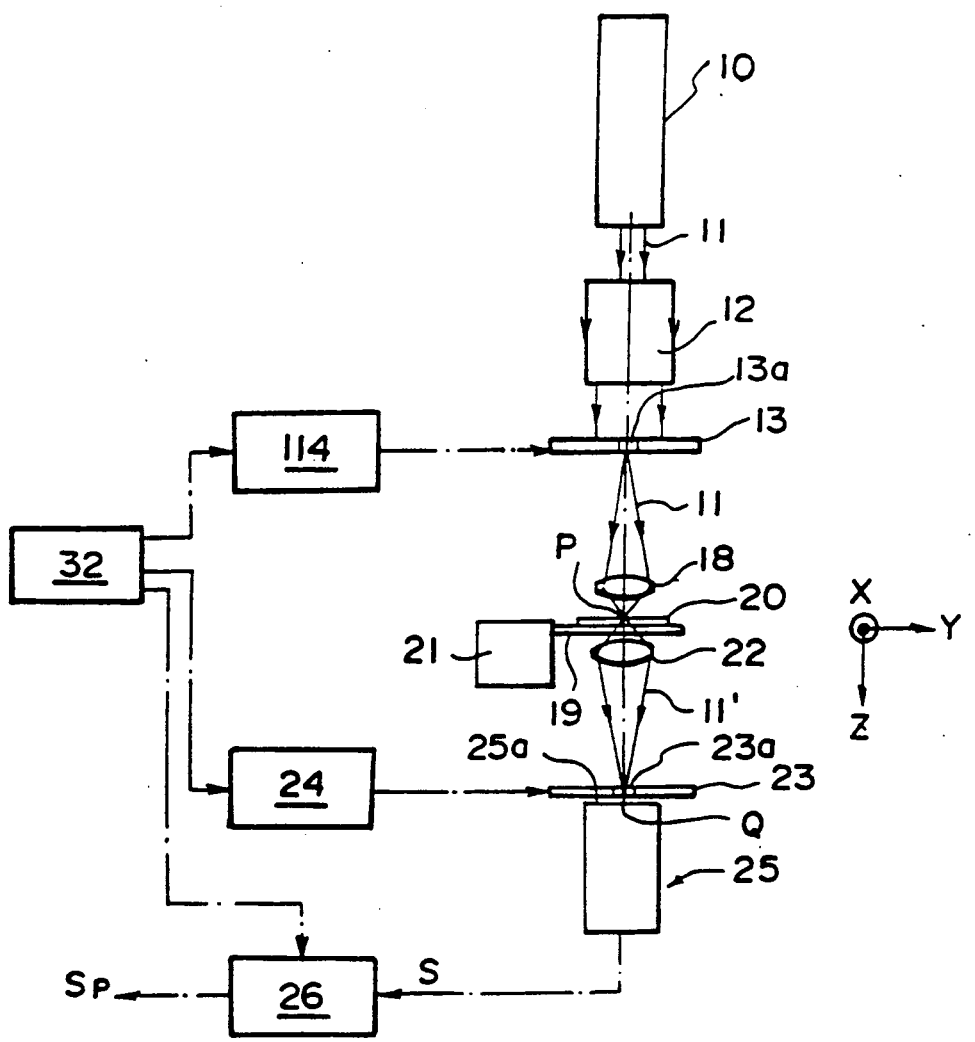
FIG. 7 is a schematic side view showing a first embodiment of the third scanning microscope in accordance with the present invention.

FIG. 7 shows a first embodiment of the third scanning microscope in accordance with the present invention, which is constituted as a transmission type confocal scanning microscope. In FIG. 7, similar elements are numbered with the same reference numerals with respect to FIG. 1.

With reference to FIG. 7, a laser beam 11 is produced as a collimated light beam by a laser beam source 10. The beam diameter of the laser beam 11 is expanded by a beam expander 12. The laser beam 11 then impinges upon a liquid crystal panel 13.

Figure 8:
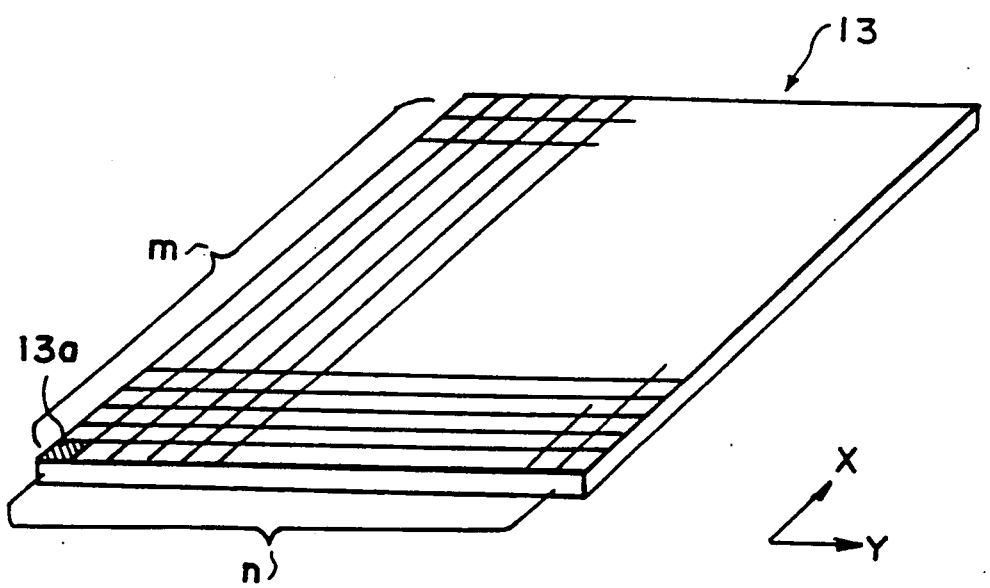
FIG. 8 is a perspective view showing a liquid crystal panel, which is employed in the first embodiment of FIG. 7.

The liquid crystal panel 13 is constituted as illustrated in FIG. 8. Specifically, m number of small liquid crystal shutters 13a, 13a, ... stand one behind another along the main scanning directions indicated by the arrow X. Also, n number of rows of the liquid crystal shutters 13a, 13a, ... stand side by side along the sub-scanning directions indicated by the arrow Y. A liquid crystal panel operating circuit 114 receives a synchronizing signal from the control circuit 32. In accordance with the synchronizing signal, the liquid crystal panel operating circuit 114 operates the liquid crystal panel 13 such that the liquid crystal shutters 13a, 13a, ... are set to the open state one after another. Specifically, in FIG. 8, m number of the liquid crystal shutters 13a, 13a, ..., which stand one behind another in the first row along the X direction, are first set to the open state one after another. Thereafter, m number of the liquid crystal shutters 13a, 13a, ... in the second row are set to the open state one after another. In the same manner, m number of the liquid crystal shutters 13a, 13a, ... in each of the third, fourth, ..., n'th rows are sequentially set to the open state. In this manner, each liquid crystal shutter 13a, which is set to the open state, serves as a point light source, and the laser beam 11 is radiated out of the liquid crystal shutter 13a. The position from which the laser beam 11 is radiated changed two-dimensionally.

The laser beam 11 then impinges upon the objective lens 18 and is condensed thereby. In this manner, the laser beam 11 is converged to a small light spot at the point P on the sample 20 (i.e. on the surface of the sample 20 or in the inside of the sample 20).

As the position, from which the laser beam 11 is radiated, changes in the manner described above, the light spot formed at the point P scans the sample 20 in main scanning directions indicated by the arrow X and in sub-scanning directions indicated by the arrow Y, which directions are approximately normal to the main scanning directions indicated by the arrow X. When the light spot formed at the point P is caused to scan two-dimensionally in the manner described above, the position at which the point image Q is formed moves two-dimensionally in accordance with the scanning. In order to cope with the movement of the position of the point image Q, the liquid crystal panel operating circuit 24 receives a synchronizing signal from the control circuit 32. In accordance with the synchronizing signal, the liquid crystal panel operating circuit 24 operates the liquid crystal panel 23, which has the configuration shown in FIG. 2, in synchronization with the main scanning and the sub-scanning with the light spot formed at the point P such that a liquid crystal shutter 23a corresponding to the position, at which the point image Q is formed at any given instant, is set to the open state. In this manner, the liquid crystal shutters 23a, 23a, ... are set to the open state one after another. Specifically, m number of the liquid crystal shutters 23a, 23a, ..., which stand one behind another in the first row along the X direction, are first set to the open state one after another. Thereafter, m number of the liquid crystal shutters 23a, 23a, ... in the second row are set to the open state one after another. In the same manner, m number of the liquid crystal shutters 23a, 23a, ... in each of the third, fourth, ..., n'th rows are sequentially set to the open state. In this manner, a time-serial signal S representing a two-dimensional image of the sample 20 is generated by the photodetector 25. The signal S is fed to a signal processing circuit 26, which receives a synchronizing signal from the control circuit 32. By way of example, the signal processing circuit 26 integrates the signal S with a predetermined period and in synchronization with the main scanning and the sub-scanning with the light spot formed at the point P (i.e. in synchronization with the change of the liquid crystal shutter 23a which is set to the open state). In this manner, a signal Sp, which has been divided into picture elements, is obtained.

The liquid crystal shutters 13a and 23a of the liquid crystal panels 13 and 23, which are set to the open state at any given instant, must have a conjugate relationship to each other. However, in cases where the adjustment of the optical axis was not carried out correctly, it may occur that the conjugate relationship cannot be achieved. Even in such cases, the conjugate relationship can be achieved easily in the manner described below. Specifically, by way of example, the liquid crystal shutters 13a, 13a, ... of the liquid crystal panel 13 are experimentally set to the open state one after another such that the scanning with the light spot is carried out very slowly. At this time, investigations are made as to which liquid crystal shutter 23a is irradiated with the light spot when which liquid crystal shutter 13a is set to the open state. Thereafter, the liquid crystal panel 23 is operated such that each liquid crystal shutter 23a is set to the open state in accordance with the relationship between the liquid crystal shutters 13a, 13a, ... and the liquid crystal shutters 23a, 23a, ... thus investigated.

Figure 9:
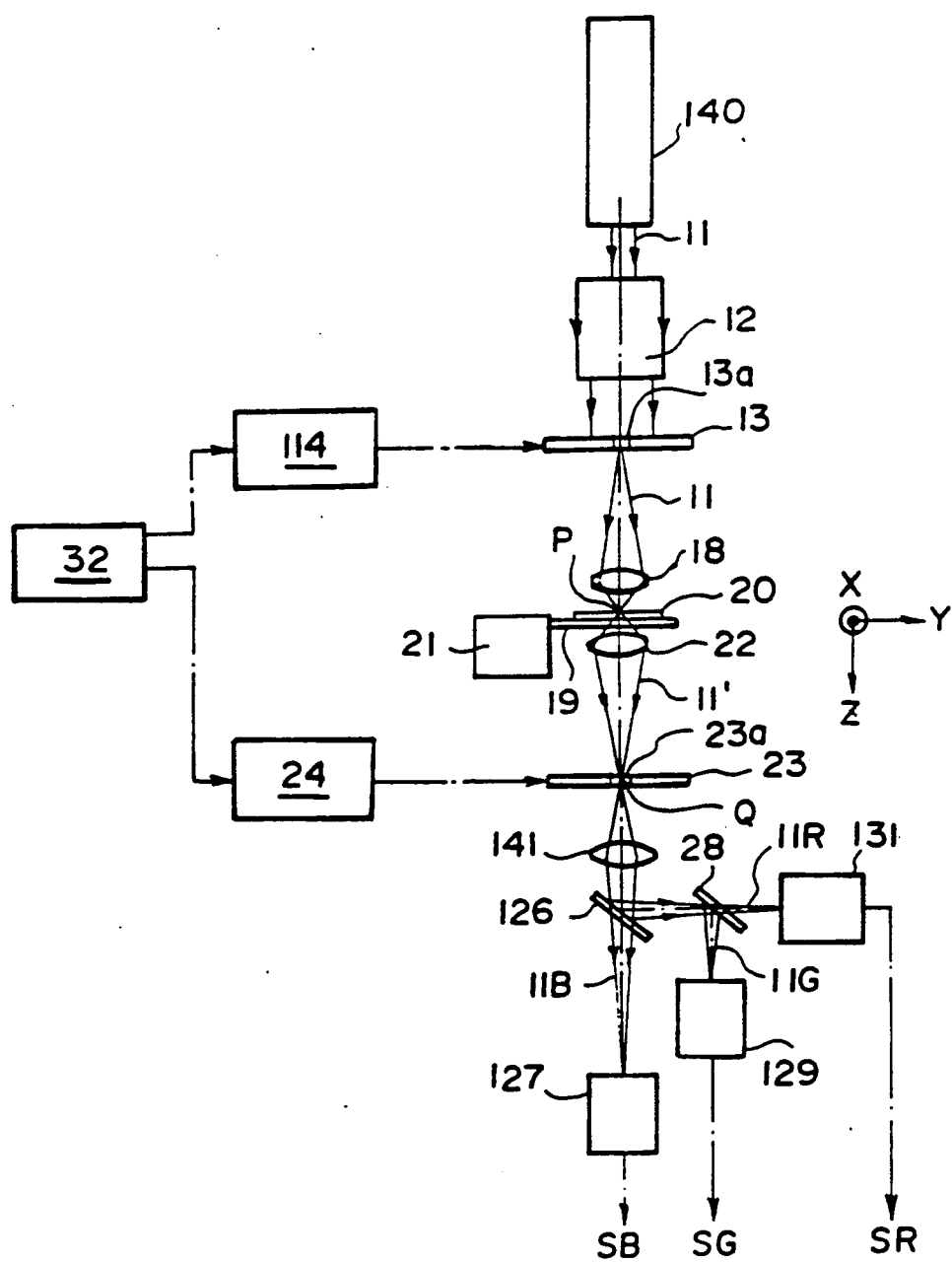
FIG. 9 is a schematic side view showing a second embodiment of the third scanning microscope in accordance with the present invention.

A second embodiment of the third scanning microscope in accordance with the present invention will be described hereinbelow with reference to FIG. 9. In FIG. 9, similar elements are numbered with the same reference numerals with respect to FIG. 7. (This also applies to the accompanying drawings described below.)

In the second embodiment of FIG. 9, a color image is obtained, and an RGB laser 40 is employed as the laser beam source. The laser beam 11', which has passed through a liquid crystal shutter 23a of the liquid crystal panel 23, is condensed by a condensing lens 141 and impinges upon a dichroic mirror 126. Only the blue light 11B passes through the dichroic mirror 126 and is detected by a first photodetector 127. The laser beam 11', which has been reflected by the dichroic mirror 126, impinges upon a dichroic mirror 128. Only the green light 11G is reflected by the dichroic mirror 128. The green light 11G is detected by a second photodetector 129. The laser beam 11' (i.e. the red light 11R), which has passed through the dichroic mirror 128, is detected by a third photodetector 131. The photodetectors 127, 129, and 131 generate signals SB, SG, and SR, which represent the blue components, the green components, and the red components of an enlarged image of the sample 20.

A third embodiment of the third scanning microscope in accordance with the present invention will be described hereinbelow with reference to FIG. 10.

Figure 10:
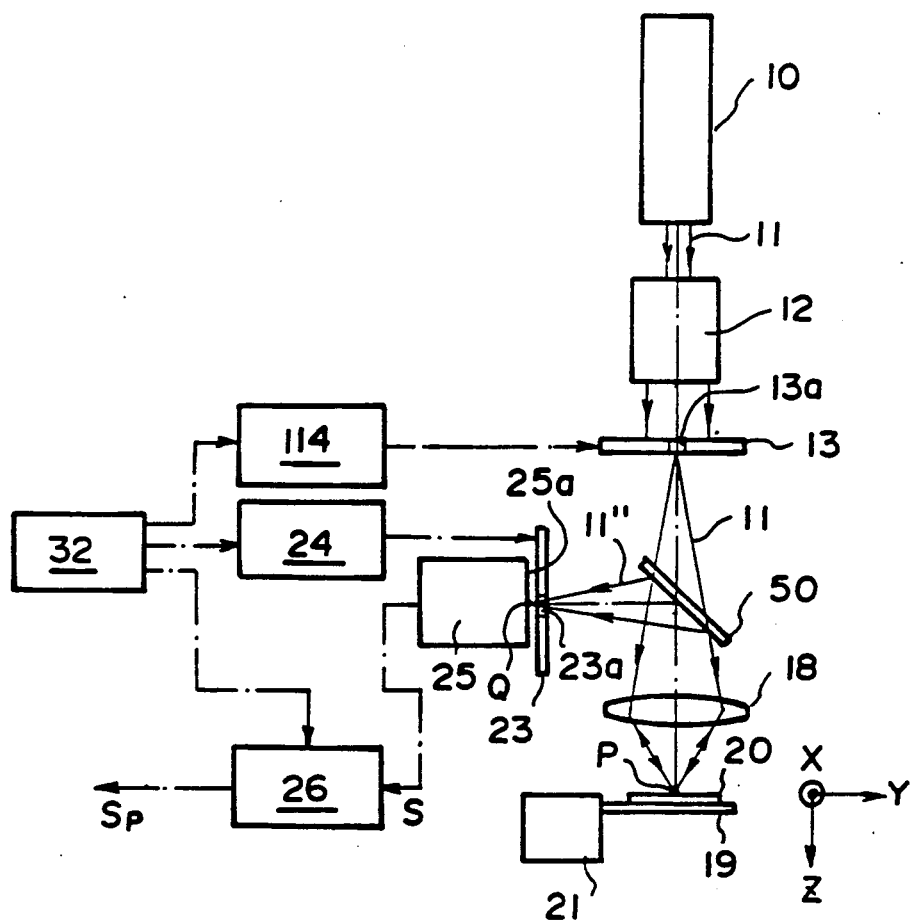
FIGS. 10, 11, 12, and 13 are schematic side views showing third, fourth, fifth, and sixth embodiments of the third scanning microscope in accordance with the present invention.

The third embodiment of FIG. 10 is of the reflection type. In this embodiment, the laser beam 11, which has been radiated out of a liquid crystal shutter 13a of the liquid crystal panel 13 which has been set to the open state, passes through a semi-transparent mirror and then impinges upon the objective lens 18. The laser beam 11 is condensed by the objective lens 18 to the point P on the sample 20. The laser beam 11 impinging upon the sample 20 is reflected thereby. The laser beam 11", which has been reflected by the sample 20, is condensed by the objective lens 18, reflected by the semi-transparent mirror 50, and then passes through a liquid crystal shutter 23a of the liquid crystal panel 23, which has been set to the open state. In this manner, the laser beam 11" is detected by the photodetector 25.

In this embodiment, the liquid crystal panels 13 and 23 are operated in the same manner as that in the first embodiment of FIG. 7. Therefore, the light spot formed at the point P two-dimensionally scans the sample 20, and a signal S representing an enlarged image of the sample 20 is generated by the photodetector 25.

The reflection type scanning microscope can be constituted in the manner shown in FIG. 9 such that a color image can be obtained.

A fourth embodiment of the third scanning microscope in accordance with the present invention will be described hereinbelow with reference to FIG. 11.

Figure 11:
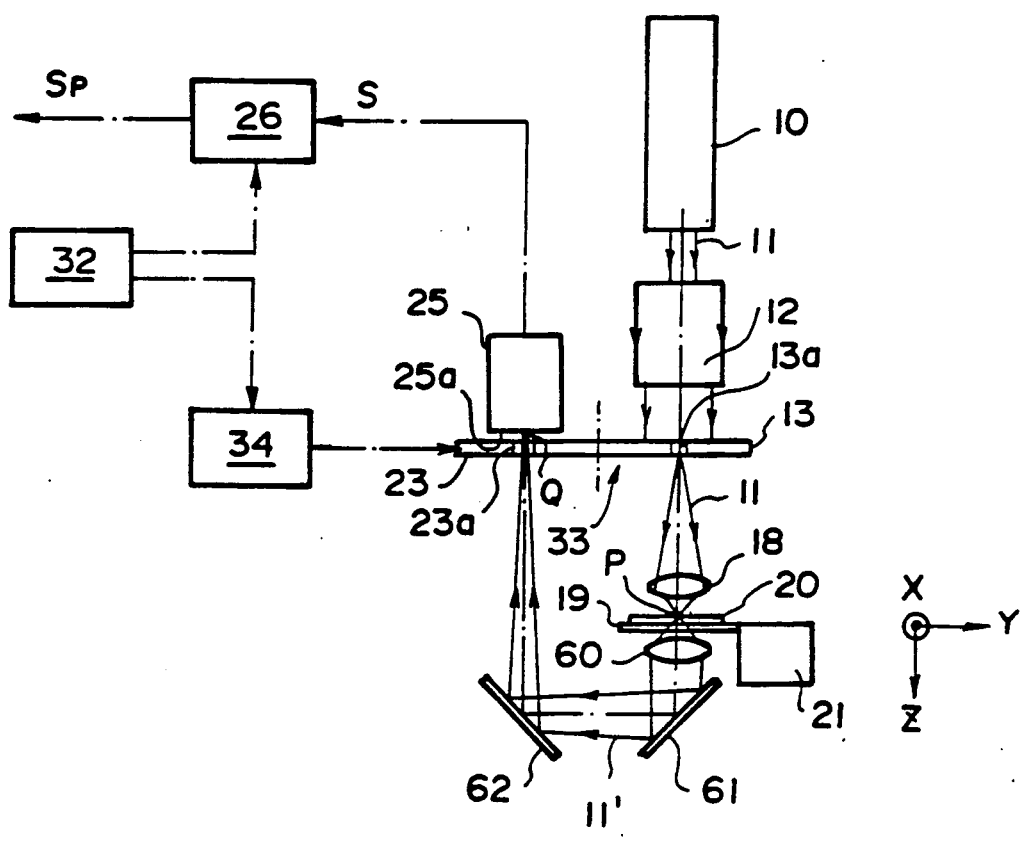

In the third embodiment of FIG. 11, only a single liquid crystal panel 33 is provided. The right half part of the liquid crystal panel 33 serves as the liquid crystal panel 13 for the scanning with the laser beam 11. The left half part of the liquid crystal panel 33 serves as the liquid crystal panel 23 for blocking a halo, or the like.

The laser beam 11', which has passed through the sample 20, is condensed by an objective lens 60 and then reflected by mirrors 61 and 62. Thereafter, a point image Q is formed. The point image Q is detected by the photodetector 25 through a liquid crystal shutter 23a of the liquid crystal panel 23, which has been set to the open state.

The single liquid crystal panel 33 is operated by a liquid crystal panel operating circuit 34 such that two corresponding liquid crystal shutters 13a and 23a, which are located in a predetermined relation to each other, are simultaneously set to the open state. Such operations can be achieved easily, for example, by adjusting the connection of scanning electrodes of the liquid crystal panel 33 and the liquid crystal panel operating circuit 34. Such an operation method can be achieved with a simpler circuit than when, as shown in FIG. 7, the liquid crystal panels 13 and 23 independent from each other are operated in synchronization with each other such that a single liquid crystal shutter 13a and a single liquid crystal shutter 23a are set to the open state.

A fifth embodiment of the third scanning microscope in accordance with the present invention will be described hereinbelow with reference to FIG. 12. In this embodiment the single liquid crystal panel 33 employed in the embodiment of FIG. 11 is applied to the reflection type scanning microscope.

Figure 12:
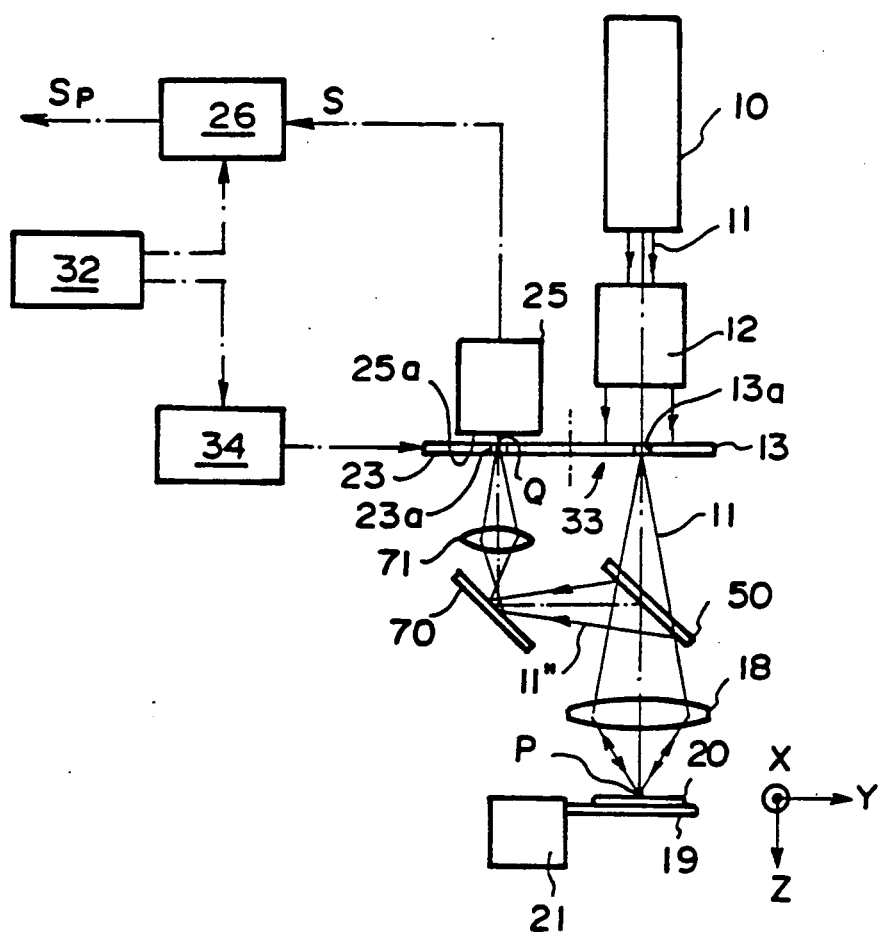

With reference to FIG. 12, the laser beam 11, which has been radiated out of a liquid crystal shutter 13a of the liquid crystal panel 33 which has been set to the open state, passes through a semi-transparent mirror 50 and then impinges upon the objective lens 18. The laser beam 11 is condensed by the objective lens 18 to the point P on the sample 20. The laser beam 11 impinging upon the sample 20 is reflected thereby. The laser beam 11", which has been reflected by the sample 20, is condensed by the objective lens 18, and reflected by the semi-transparent mirror 50. The laser beam 11' is then reflected by a mirror 70 and impinges upon a condensing lens 71. A point image Q is thus formed by the condensing lens 71. In this embodiment, the liquid crystal panel 33 is operated in the same manner as that in the embodiment of FIG. 11.

Figure 13:
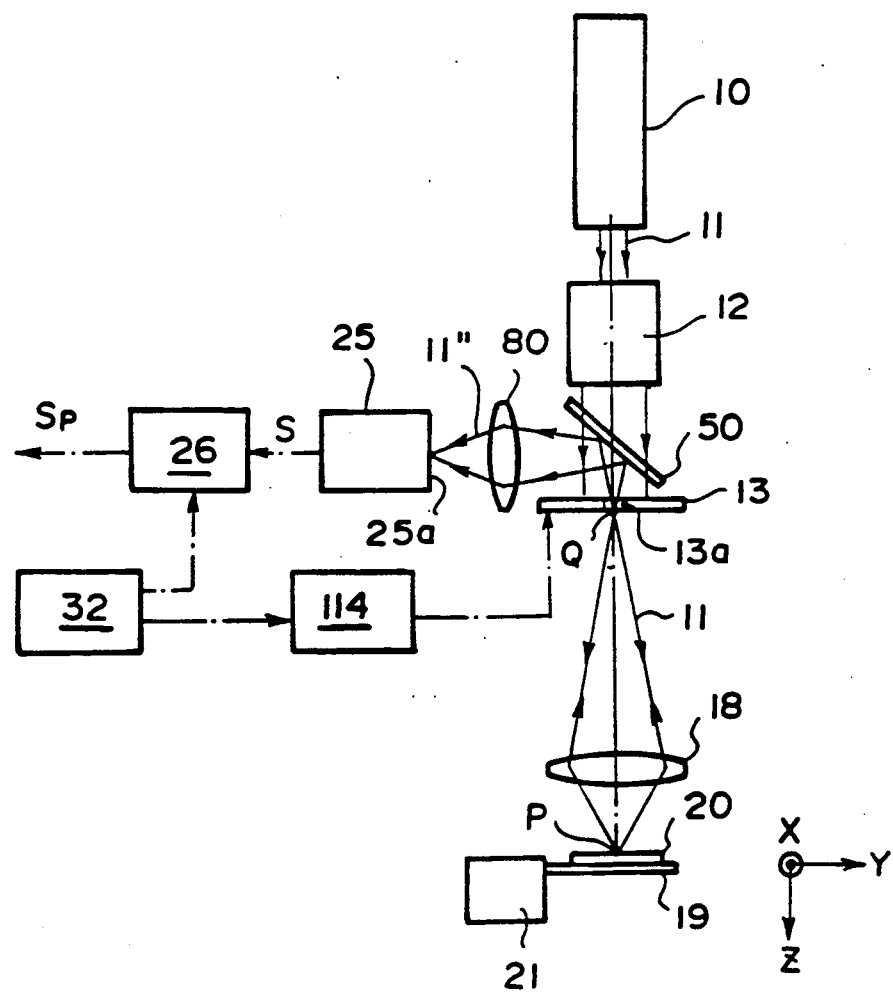

A sixth embodiment of the third scanning microscope in accordance with the present invention will be described hereinbelow with reference to FIG. 13. Like the embodiment shown in FIG. 10, this embodiment is constituted as a reflection type. In this embodiment, the semi-transparent mirror 50 is located between the beam expander 12 and the liquid crystal panel 13. The laser beam 11", which has been reflected by the sample 20, is condensed by the objective lens 18, and then passes through a liquid crystal shutter 13a of the liquid crystal panel 13, which has been set to the open state. The laser beam 11" is then reflected by the semi-transparent mirror 50, condensed by a condensing lens 80, and detected by the photodetector 25.

In this embodiment, the liquid crystal panel 13 for scanning the laser beam 11 is used also as the liquid crystal panel for blocking a halo, or the like. With this embodiment, no means need be provided to synchronize the operations of two liquid crystal panels. Also, the size of the single liquid crystal panel employed can be kept smaller than in the embodiments shown in FIGS. 11 and 12. Therefore, the scanning microscope can be kept very simple.

In the aforesaid embodiments of the third scanning microscope in accordance with the present invention, in order for good resolution to be obtained, it is desirable that the effective shutter sizes of the liquid crystal shutters 13a, 13a, ... of the liquid crystal panel 13 be sufficiently small. For this purpose, as shown in FIG. 14, a liquid crystal panel 13', which is of the same type as the liquid crystal panel 13, may be superposed upon the liquid crystal panel 13 such that the positions of each liquid crystal shutter 13a and the corresponding liquid crystal shutter 13a', which have the same size, deviate by a ½ pitch along the main scanning directions and the sub-scanning directions.

Figure 14:
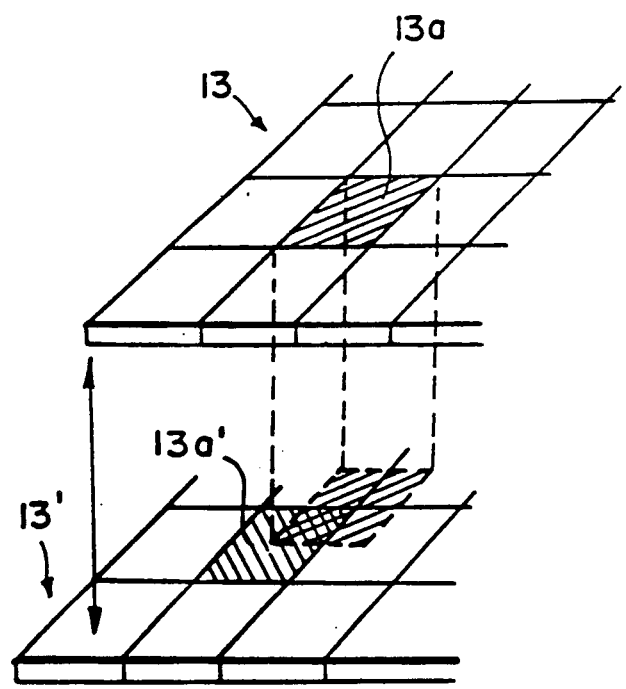
FIG. 14 is an exploded perspective view showing a combination of liquid crystal panels, which may be employed in the third scanning microscope in accordance with the present invention.

With the combination of the liquid crystal panel 13 and the liquid crystal panel 13' shown in FIG. 14, the laser beam 11 can pass only through the part at which a liquid crystal shutter 13a and a liquid crystal shutter 13a', which have been set to the open state and which are hatched in FIG. 14, overlap one upon the other. Therefore, the liquid crystal panel 13 and the liquid crystal panel 13' are operated such that the period, with which a liquid crystal shutter 13a set to the open state changes (i.e. the time occurring from when a certain liquid crystal shutter 13a is set to the open state to when the adjacent liquid crystal shutter 13a is set to the open state), and the period, with which a liquid crystal shutter 13a' set to the open state changes, deviate by a ½ period from each other. As a result, the effective shutter size becomes equal to approximately ½ of the size of the liquid crystal shutter 13a or the liquid crystal shutter 13a' when the boundary part between adjacent shutters is not taken into consideration.

In the aforesaid embodiments of the third scanning microscope in accordance with the present invention, the liquid crystal panel 23 for blocking a halo, or the like, is provided in addition to the liquid crystal panel 13 for scanning the light spot of the laser beam 11 formed at the point P. In the third scanning microscope in accordance with the present invention, the liquid crystal panel 23 need not necessarily be provided. In cases where the liquid crystal panel 23 is not provided, by way of example, a point photodetector, which is provided with a pinhole at the light receiving surface, may be moved in synchronization with the scanning with the light spot of the laser beam 11. Alternatively, the point photodetector is kept stationary, and the laser beam, which has passed through the sample 20, or the laser beam, which has been reflected by the sample 20, may be deflected in synchronization with the scanning with the light spot and guided to the position, at which the pinhole is located.

However, as in the aforesaid embodiments of the third scanning microscope in accordance with the present invention, the liquid crystal panel 23 should preferably be provided in addition to the liquid crystal panel 13. This is because the scanning with the light spot of the laser beam, which is irradiated to the sample 20, and the scanning of the point, at which the point image Q is detected, can be easily synchronized with each other, or operations for synchronizing them become unnecessary.

Also, in the third scanning microscope in accordance with the present invention, instead of the liquid crystal shutters being used, other light shutters, for example, PLZT shutters, may be employed.

The third scanning microscope in accordance with the present invention is applicable also to scanning microscopes other than the confocal scanning microscopes.

Also, the scanning mechanisms employed in the aforesaid embodiments of the third scanning microscope in accordance with the present invention are also applicable when the scanning is to be carried out in apparatuses other than microscopes. For example, the scanning mechanisms described above may be employed when the scanning is to be carried out during the writing of information in memories, the reading of information from memories, and the detection of video or audio signals from recording media.

We claim:

1. A confocal scanning microscope comprising:
   (i) a sample supporting member on which a sample is supported,
   (ii) a light source which produces a light beam,
   (iii) a light projecting optical means with which an image of said light beam is formed as a small light spot on said sample,
   (iv) a scanning mechanism which causes said light spot to scan said sample in main scanning directions and sub-scanning directions,
   (v) a light receiving optical means with which the light beam, which has passed through said sample, is condensed, and an image of the condensed light beam is formed as a point image,
   (vi) a shutter array provided with a plurality of small light shutters, which are arrayed two-dimensionally, said shutter array being located at a plane on which said point image is formed,
   (vii) a shutter array operating circuit which sets a light shutter corresponding to the position, at which said point image is formed at any given instant, to an open state in synchronization with the main scanning and the sub-scanning with said light spot, said shutter array operating circuit thus setting said light shutters one after another to the open state,
   (viii) a photodetector having a light receiving surface, which faces the whole surface of said shutter array, said photodetector detecting said point image through the light shutter, which has been set to the open state, and
   (ix) a circuit for dividing the output of said photodetector into picture elements in synchronization with the main scanning and the sub-scanning with said light spot.

2. A confocal scanning microscope as defined in claim 1 wherein said light shutters are liquid crystal shutters.

3. A confocal scanning microscope as defined in claim 1 wherein said light shutters are PLZT shutters.

4. A confocal scanning microscope as defined in claim 1 wherein said shutter array is composed of two shutter arrays, which are of the same type and which are superposed one upon the other such that the positions of corresponding light shutters of the two shutter arrays, which light shutters have the same size, deviate by a ½ pitch along the main scanning directions and the subscanning directions.

5. A confocal scanning microscope as defined in claim 4 wherein said shutter array operating circuit operates said two shutter arrays such that the period, with which a light shutter set to the open state changes in one of said two shutter arrays, and the period, with which a light shutter set to the open state changes in the other shutter array, deviate by a ½ period from each other.

6. A confocal scanning microscope as defined in claim 1 wherein said light source is a laser.

7. A confocal scanning microscope comprising:
   (i) a sample supporting member on which a sample is supported,
   (ii) a light source which produces a light beam,
   (iii) a light projecting optical means with which an image of said light beam is formed as a small light spot on said sample,
   (iv) a scanning mechanism which causes said light spot to scan said sample in main scanning directions and sub-scanning directions,
   (v) a light receiving optical means with which the light beam, which has passed through said sample, is condensed, and an image of the condensed light beam is formed as a point image,
   (vi) a shutter array provided with a plurality of linear light shutters, which extend along said main scanning directions and which stand side by side along said sub-scanning directions, said shutter array being located at a plane on which said point image is formed,
   (vii) a shutter array operating circuit which sets a light shutter corresponding to the position, at which said point image is formed at any given instant, to an open state in synchronization with the sub-scanning with said light spot, said shutter array operating circuit thus setting said light shutters one after another to the open state, and (viii) a photodetector constituted of an area sensor having a plurality of small light receiving elements, which are arrayed along said main scanning directions and said sub-scanning directions, said photodetector detecting said point image through the light shutter, which has been set to the open state.

8. A confocal scanning microscope as defined in claim 7 wherein said light shutters are liquid crystal shutters.

9. A confocal scanning microscope as defined in claim 7 wherein said light shutters are PLZT shutters.

10. A confocal scanning microscope as defined in claim 7 wherein said shutter array is composed of two shutter arrays, which are of the same type and which are superposed one upon the other such that the positions of corresponding light shutters of the two shutter arrays, which light shutters have the same size, deviate by a ½ pitch along the sub-scanning directions.

11. A confocal scanning microscope as defined in claim 10 wherein said shutter array operating circuit operates said two shutter arrays such that the period, with which a light shutter set to the open state changes in one of said two shutter arrays, and the period, with which a light shutter set to the open state changes in the other shutter array, deviate by a ½ period from each other.

12. A confocal scanning microscope as defined in claim 7 wherein said light source is a laser.

13. A scanning microscope comprising:
(i) a means for converging a light beam, which is irradiated to a sample, to a small light spot on said sample,
(ii) a scanning mechanism for two-dimensionally scanning said light spot on said sample, and
(iii) a means for photoelectrically detecting the light beam, which is radiated out of said sample and thereby obtaining an image signal representing an enlarged image of said sample,
wherein said scanning mechanism is composed of:
(a) a shutter array provided with a plurality of small light shutters, which are arrayed two-dimensionally, said shutter array being located in the optical path of said light beam, which is irradiated to said sample, and
(vii) a shutter array operating circuit which sets said light shutters of said shutter array one after another to an open state.

14. A scanning microscope as defined in claim 13 wherein said light shutters are liquid crystal shutters.

15. A scanning microscope as defined in claim 13 wherein said light shutters are PLZT shutters.

16. A scanning microscope as defined in claim 13 wherein said shutter array is composed of two shutter arrays, which are of the same type and which are superposed one upon the other such that the positions of corresponding light shutters of the two shutter arrays, which light shutters have the same size, deviate by a ½ pitch in two directions.

17. A scanning microscope as defined in claim 16 wherein said shutter array operating circuit operates said two shutter arrays such that the period, with which a light shutter set to the open state changes in one of said two shutter arrays, and the period, with which a light shutter set to the open state changes in the other shutter array, deviate by a ½ period from each other.

18. A scanning microscope as defined in claim 13 wherein said light source is a laser.

19. A scanning mechanism for converging a light beam, which is irradiated to a material to be scanned, to a small light spot on said material to be scanned, and two-dimensionally scanning said light spot on said material to be scanned,
wherein the improvement comprises the provision of:
(a) a shutter array provided with a plurality of small light shutters, which are arrayed two-dimensionally, said shutter array being located in the optical path of said light beam, which is irradiated to said material to be scanned, and
(vii) a shutter array operating circuit which sets said light shutters of said shutter array one after another to an open state.

20. A scanning mechanism as defined in claim 19 wherein said light shutters are liquid crystal shutters.

21. A scanning mechanism as defined in claim 19 wherein said light shutters are PLZT shutters.

22. A scanning mechanism as defined in claim 19 wherein said shutter array is composed of two shutter arrays, which are of the same type and which are superposed one upon the other such that the positions of corresponding light shutters of the two shutter arrays, which light shutters have the same size, deviate by a ½ pitch in two directions.

23. A scanning mechanism as defined in claim 22 wherein said shutter array operating circuit operates said two shutter arrays such that the period, with which a light shutter set to the open state changes in one of said two shutter arrays, and the period, with which a light shutter set to the open state changes in the other shutter array, deviate by a ½ period from each other.

24. A scanning mechanism as defined in claim 19 wherein said light source is a laser.

* * * * *